United States Patent
Yang et al.

(10) Patent No.: US 10,775,756 B2
(45) Date of Patent: Sep. 15, 2020

(54) SYNCHRONOUS CONTROL METHOD AND SYNCHRONOUS CONTROL SYSTEM OF MULTIPLE CONTROLLED COMPONENTS

(71) Applicant: BEIJING ETECHWIN ELECTRIC CO., LTD., Beijing (CN)

(72) Inventors: Zhiqian Yang, Beijing (CN); Rui Gao, Beijing (CN)

(73) Assignee: BEIJING ETECHWIN ELECTRIC CO., LTD., Beijing (CN)

(*) Notice: Subject to any disclaimer, the term of this patent is extended or adjusted under 35 U.S.C. 154(b) by 213 days.

(21) Appl. No.: 16/073,456

(22) PCT Filed: Feb. 17, 2017

(86) PCT No.: PCT/CN2017/073922
§ 371 (c)(1),
(2) Date: Jul. 27, 2018

(87) PCT Pub. No.: WO2017/148279
PCT Pub. Date: Sep. 8, 2017

(65) Prior Publication Data
US 2019/0339660 A1    Nov. 7, 2019

(30) Foreign Application Priority Data

Feb. 29, 2016  (CN) .......................... 2016 1 0113558

(51) Int. Cl.
*G05B 19/042*  (2006.01)
(52) U.S. Cl.
CPC .. *G05B 19/0421* (2013.01); *G05B 2219/2208* (2013.01); *G05B 2219/2214* (2013.01);
(Continued)
(58) Field of Classification Search
CPC .................................................. G05B 19/0421
See application file for complete search history.

(56) References Cited

U.S. PATENT DOCUMENTS

| 5,222,017 A | 6/1993 | Yellowley et al. |
| 5,913,053 A | 6/1999 | Nonogaki et al. |

(Continued)

FOREIGN PATENT DOCUMENTS

| CN | 101610055 A | 12/2009 |
| CN | 103197978 A | 7/2013 |
| CN | 103744373 A | 4/2014 |
| CN | 103873037 A | 6/2014 |
| CN | 103873739 A | 6/2014 |

(Continued)

OTHER PUBLICATIONS

The International Search Report dated May 22, 2017; PCT/CN2017/073922.

(Continued)

*Primary Examiner* — Mark A Connolly (57) ABSTRACT

The embodiments of the present disclosure provide a synchronous control method and a synchronous control system. The synchronous control method includes: acquiring respectively response durations during which multiple controlled components execute their corresponding control instructions; determining respectively instruction execution delay durations corresponding to the multiple controlled components according to the response durations during which the multiple controlled components execute their corresponding control instructions, and controlling the multiple controlled components to execute their corresponding control instructions according to the instruction execution delay durations corresponding to the multiple controlled components, such that the multiple controlled components are able to complete their corresponding operations synchronously.

12 Claims, 6 Drawing Sheets

(52) U.S. Cl.
CPC .......... *G05B 2219/2231* (2013.01); *G05B 2219/2236* (2013.01); *G05B 2219/25483* (2013.01)

(56) References Cited

U.S. PATENT DOCUMENTS

| | | | | |
|---|---|---|---|---|
| 2008/0258563 | A1* | 10/2008 | Hodges | H01R 25/006 307/112 |
| 2011/0177780 | A1* | 7/2011 | Sato | H04W 36/14 455/41.1 |
| 2014/0098247 | A1* | 4/2014 | Rao | H04W 4/20 348/207.1 |
| 2015/0163758 | A1* | 6/2015 | Frison | G08B 25/10 370/350 |
| 2019/0339660 | A1* | 11/2019 | Yang | G05B 19/0421 |

FOREIGN PATENT DOCUMENTS

| | | |
|---|---|---|
| CN | 104238435 A | 12/2014 |
| CN | 105049309 A | 11/2015 |
| CN | 105204477 A | 12/2015 |
| CN | 105652749 A | 6/2016 |
| EP | 1705541 A2 | 9/2006 |
| EP | 1894790 A1 | 3/2008 |
| EP | 2381326 A2 | 10/2011 |
| WO | 2004/027530 A1 | 4/2004 |

OTHER PUBLICATIONS

The First Chinese Office Action dated Oct. 9, 2017; Appln. No. 201610113558.X.
Extended European Search Report dated Jun. 3, 2019; Appln. No. 17759130.2.

* cited by examiner

SYNCHRONOUS CONTROL METHOD AND SYNCHRONOUS CONTROL SYSTEM OF MULTIPLE CONTROLLED COMPONENTS

CROSS-REFERENCE TO RELATED APPLICATION

This application is based on and claims priority to Chinese Patent Application No. 201610113558.X filed on Feb. 29, 2016, which is incorporated herein by reference in its entirety.

TECHNICAL FIELD

The present application relates to the field of control technology, and more particularly to a synchronous control method and synchronous control system of multiple controlled components.

BACKGROUND

In various control systems including a centralized control system and a distributed control system, it is often necessary to control multiple controlled components to work cooperatively to complete one or more control functions. For example, a converter of a wind power generation system usually may include multiple controllers which may constitute a distributed control system; these controllers may include a master controller and multiple slave controllers; and when performing a certain control function such as the converter overload protection function, the main controller may generate control instructions and send the control instructions to the slave controllers and/or the controlled component, and the slave controllers may forward the control instructions to the corresponding controlled components after receiving the control instructions sent by the master controller.

However, due to the communication delay between the master controller and the slave controllers in the distributed control system and the difference in the response durations during which the controlled components execute their corresponding control instructions, the controlled components that work cooperatively may not be able to complete their corresponding operations synchronously, which may result in a mechanical or electrical overload of the controlled components, and cause damage to the controlled components.

SUMMARY

The embodiments of the present disclosure provide a synchronous control method of multiple controlled components that work cooperatively and a synchronous control system which implements the method, such that the multiple controlled components that work cooperatively may be able to complete the operations corresponding to the control instructions synchronously, therefore a mechanical or electrical overload failure of the controlled components may be avoided, and a damage rate of the controlled components may be reduced.

According to one aspect of the present disclosure, a synchronous control method of multiple controlled components is provided. The synchronous control method may include: acquiring respectively response durations during which the multiple controlled components execute their corresponding control instructions; determining respectively instruction execution delay durations corresponding to the multiple controlled components according to the response durations during which the multiple controlled components execute their corresponding control instructions, and controlling the multiple controlled components to execute their corresponding control instructions according to the instruction execution delay durations corresponding to the multiple controlled components, such that the multiple controlled components are able to complete their corresponding operations synchronously.

In some embodiments of the one aspect of the present disclosure, the multiple controlled components may include a first controlled component directly receiving control instructions sent by a first controller and/or a second controlled component receiving control instructions sent by the first controller via a second controller.

In some embodiments of the one aspect of the present disclosure, the process of determining respectively the instruction execution delay durations corresponding to the multiple controlled components according to the response durations during which the multiple controlled components execute their corresponding control instructions may include: selecting a maximum response duration among the response durations of the multiple controlled components; increasing the maximum response duration by a communication period between the first controller and the second controller if the controlled component corresponding to the maximum response duration is the second controlled component; using a difference value between the maximum response duration and the response duration of the first controlled component as the instruction execution delay duration of the first controlled component, and/or using a difference value obtained by the maximum response duration subtracting a sum value of the response duration of the second controlled component and the communication period between the first controller and the second controller as the instruction execution delay duration of the second controlled component.

In some embodiments of the one aspect of the present disclosure, the process of controlling the multiple controlled components to execute their corresponding control instructions according to the instruction execution delay durations corresponding to the multiple controlled components may include: sending, by the first controller, control instructions of the second controlled component to the second controller after waiting for the instruction execution delay duration of the second controlled component or the number of clock ticks corresponding the instruction execution delay duration of the second controlled component, or sending the control instructions of the second controlled component and the instruction execution delay duration to the second controller, such that the second controller sends the control instructions of the second controlled component to the second controlled component after waiting for the instruction execution delay duration of the second controlled component or the number of clock ticks corresponding the instruction execution delay duration of the second controlled component, the number of clock ticks corresponding to the instruction execution delay duration of the second controlled component is a ratio of the instruction execution delay duration of the second controlled component to a sampling period of the second controller; or/and sending, by the first controller, control instructions of the first controlled component to the first controlled component after waiting for the instruction execution delay duration of the first controlled component or the number of clock ticks corresponding the instruction execution delay duration of the first controlled component, the number of clock ticks corresponding to the instruction execution delay duration of the first controlled component is a ratio of the instruction execution delay duration of the first controlled component to a sampling period of the first controller.

In some embodiments of the one aspect of the present disclosure, the synchronous control method may further include: acquiring a minimum response duration from the response durations of the multiple controlled components; determining the communication period between the first controller and the second controller according to the minimum response duration.

According to another aspect of the present disclosure, a synchronous control system of multiple controlled components is provided. the synchronous control system comprising a first controller and multiple controlled components connected with the first controller, wherein the first controller may include: a response duration acquisition module for acquiring respectively response durations during which the multiple controlled components execute their corresponding control instructions; a control module for determining respectively instruction execution delay durations corresponding to the multiple controlled components according to the response durations during which the multiple controlled components execute their corresponding control instructions, and controlling the multiple controlled components to execute their corresponding control instructions according to the instruction execution delay durations corresponding to the multiple controlled components, such that the multiple controlled components are able to complete their corresponding operations synchronously.

In some embodiments of the another aspect of the present disclosure, the synchronous control system may further include a second controller, the multiple controlled components may include a first controlled component directly receiving control instructions sent by the first controller and/or a second controlled component receiving control instructions sent by the first controller via the second controller, the first controller is connected with the second controller.

In some embodiments of the another aspect of the present disclosure, the control module may include: a selection unit for selecting a maximum response duration among the response durations of the multiple controlled components; an adjustment unit for increasing the maximum response duration by a communication period between the first controller and the second controller if the controlled component corresponding to the maximum response duration is the second controlled component; an instruction execution delay duration determination unit for using a difference value between the maximum response duration and the response duration of the first controlled component as the instruction execution delay duration of the first controlled component, and/or using a difference value obtained by the maximum response duration subtracting a sum value of the response duration of the second controlled component and the communication period between the first controller and the second controller as the instruction execution delay duration of the second controlled component.

In some embodiments of the another aspect of the present disclosure, the control module may further include: a cooperative control unit for sending control instructions of the second controlled component to the second controller after waiting for the instruction execution delay duration of the second controlled component or the number of clock ticks corresponding the instruction execution delay duration of the second controlled component, or sending the control instructions of the second controlled component and the instruction execution delay duration to the second controller, such that the second controller sends the control instructions of the second controlled component to the second controlled component after waiting for the instruction execution delay duration of the second controlled component or the number of clock ticks corresponding the instruction execution delay duration of the second controlled component, the number of clock ticks corresponding to the instruction execution delay duration of the second controlled component is a ratio of the instruction execution delay duration of the second controlled component to a sampling period of the second controller; or/and sending control instructions of the first controlled component to the first controlled component after waiting for the instruction execution delay duration of the first controlled component or the number of clock ticks corresponding the instruction execution delay duration of the first controlled component, the number of clock ticks corresponding to the instruction execution delay duration of the first controlled component is a ratio of the instruction execution delay duration of the first controlled component to a sampling period of the first controller.

In some embodiments of the another aspect of the present disclosure, the first controller may further include: a minimum response duration acquisition module for acquiring a minimum response duration from the response durations of the multiple controlled components; a communication period determination module for determining the communication period between the first controller and the second controller according to the minimum response duration.

DETAILED DESCRIPTION

The inventive idea of the present disclosure is to control the time at which the corresponding controlled components may complete the control instructions by controlling the sending time of the control instructions of the controlled components, such that the multiple controlled components that work cooperatively may be able to complete the operations corresponding to the control instructions synchronously, and thus a mechanical or electrical overload failure of the controlled components may be avoided, and a damage rate of the controlled components may be reduced.

Exemplary embodiments of the present disclosure will be described in detail below with reference to the accompanying drawings.

Embodiment 1

Figure 1:
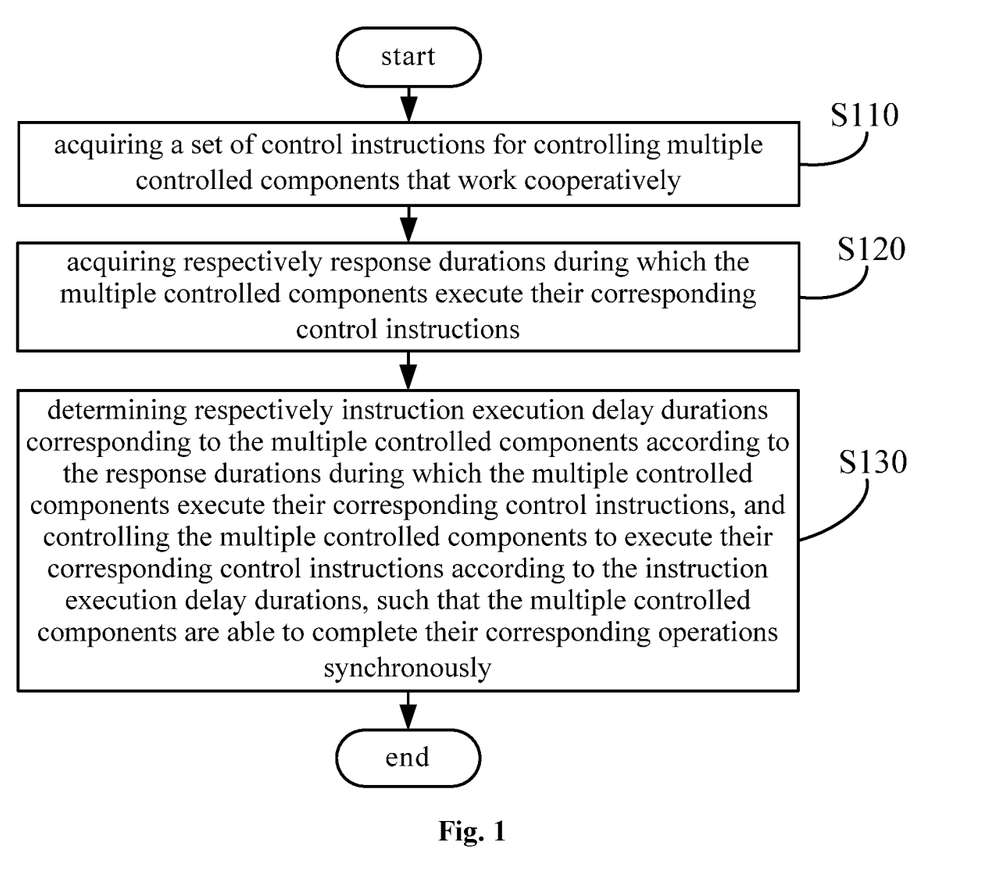
FIG. 1 is a flow diagram illustrating a synchronous control method of multiple controlled components according to embodiment 1 of the present disclosure.

FIG. 1 is a flow diagram illustrating a synchronous control method of multiple controlled components according to embodiment 1 of the present disclosure. The synchronous control method shown in FIG. 1 may be executed by the synchronous control system shown in FIG. 4, and the synchronous control method may be specifically executed by a controller or the like in the synchronous control system.

With reference to FIG. 1, the synchronous control method of multiple controlled components according to embodiment 1 of the present disclosure may include the following steps.

In S110, a set of control instructions for controlling the multiple controlled components that work cooperatively may be acquired.

Wherein, the controlled component may be any electrical component (for example, an air switch, a transformer, an ammeter, and a voltmeter) or mechanical component (for example, a brake, a transmission shaft, and a coupling) which may be controlled by the controller. The control instruction may be an instruction for controlling the controlled component to perform an operation, such as a control instruction for controlling a circuit breaker to open. The above controller may be, for example, a programmable logic controller PLC or the like, which may generate a control instruction through a control function to be executed and then send the control instruction to the controlled component to control the controlled component to perform a corresponding operation.

In particular, the controller and the controlled components may be generally included in the synchronous control system, and the controller may control the controlled components to perform corresponding operations by sending control instructions to the controlled components. When the synchronous control system is working normally, the controller may determine whether the controlled components are working normally or not by monitoring the working status of the controlled components. For a control function performed by the controller, it often requires multiple controlled components to work cooperatively to implement the control function. Therefore, when performing the control function, the controller may analyze the control function and decompose it into control instructions for controlling the multiple controlled components that work cooperatively, resulting in a set of control instructions consisting of the control instructions of the multiple controlled components.

In S120, the response durations during which the multiple controlled components execute their corresponding control instructions may be acquired respectively.

Wherein, the response duration may be the length of time from when the controlled component receives the control instruction to when the controlled component completes the operation corresponding to the control instruction. For example, the controlled component is a circuit breaker, and the operation corresponding to the control instruction is opening of the circuit breaker. If the circuit breaker receives the control instruction at a time of 10:05:30150, and the circuit breaker adjusts its switching status from closing to opening according to the control instruction such that the opening operation is completed at a time of 10:05:30350, the response duration of the control instruction corresponding to the opening operation of the circuit breaker is 200 milliseconds.

In particular, a control instruction may be extracted from the set of control instructions, and the corresponding controlled component may be determined by analyzing the control instruction, and then the response duration during which the controlled component executes the corresponding control instruction may be acquired. Wherein, there may be a variety of ways to acquire the response duration during which the controlled component executes the corresponding control instruction. For example, the response duration during which the controlled component executes the corresponding control instruction may be measured and recorded (or calibrated) by a timer; or the response durations during which each control component of the synchronous control system executes the corresponding control instruction may be measured and recorded respectively in advance by the timer, and the recorded response durations may be stored in a table and the table may be stored in the controller, such that after the control instruction is extracted from the set of control instructions, the response durations during which the corresponding controlled component executes the control instruction may be found from the above table.

In S130, the instruction execution delay durations corresponding to the multiple controlled components may be determined respectively according to the response durations during which the multiple controlled components execute their corresponding control instructions, and the multiple controlled components may be controlled to execute their corresponding control instructions according to the instruction execution delay durations corresponding to the multiple controlled components, such that the multiple controlled components may be able to complete their corresponding operations synchronously.

In particular, the instruction execution delay duration may be the length of time from when the control instruction is generated to when the control instruction is sent to the controlled component, which is determined in order to control the multiple controlled components that work cooperatively to complete their corresponding control instructions synchronously. For example, the multiple controlled components that work cooperatively may be a circuit breaker and an IGBT. The control instruction of the circuit breaker is an instruction for controlling the circuit breaker to open, and the control instruction of the IGBT is an instruction for controlling the IGBT to stop modulation. The response duration during which the circuit breaker executes its corresponding control instruction is 200 milliseconds, and the response duration during which the IGBT executes its corresponding control instruction is 0.4 milliseconds. If the controller simultaneously sends the corresponding control instructions to the circuit breaker and the IGBT respectively, the IGBT will complete the control instruction for controlling the IGBT to stop modulation first, and at this moment, the circuit breaker may be still in the closing state, which will cause a component (for example, a DC supporting capacitor, etc.) connected with the circuit breaker to be in the working state, resulting in the damage of the component. Therefore, the instruction execution delay durations of the circuit breaker and the IGBT may be determined respectively based on the response durations during which the circuit breaker and the IGBT execute their corresponding control instructions. Based on the above example, in order to control the circuit breaker and the IGBT to complete their corresponding operations synchronously, the instruction execution delay duration of the circuit breaker may be 0 (that is, 200−200), and the instruction execution delay duration of the IGBT may be 199.6 (that is, 200−0.4) millisecond. If the circuit breaker is directly controlled by the master controller in the distributed synchronous control system, the IGBT is indirectly controlled by the master controller through the slave controller, and the communication period between the master controller and the slave controller is 2 milliseconds, then the instruction execution delay duration of the circuit breaker may be 0 (that is, 200−200), and the instruction execution delay duration of the IGBT may be 197.6 (that is, 200−0.4−2) milliseconds.

Based on the above related contents of S110 to S130, it can be seen that for each controlled component, its corresponding parameters may include the control instruction, the response duration, and the instruction execution delay duration.

The controller may obtain the instruction execution delay durations of the controlled components through the above process, and then the controller may control the corresponding controlled components to execute their corresponding control instructions after the corresponding instruction execution delay durations respectively. For example, based on the above example of S130, the instruction execution delay duration of the circuit breaker is 0, and the instruction execution delay duration of the IGBT is 199.6 milliseconds. Therefore, after the control instructions are generated, the controller may send the control instruction of the circuit breaker first to the circuit breaker first with the control instruction being executed immediately, while the controller may send the control instruction of the IGBT to the IGBT after 199.6 milliseconds with the control instruction being executed immediately.

It should be noted that S110 and S120 do not have a strict execution order. In particular, the instruction execution delay durations may be determined according to S120 and S130 first, and when receiving the corresponding control instructions of the multiple controlled components, the multiple controlled components may then be controlled to execute their corresponding control instructions according to the instruction execution delay durations.

According to the synchronous control method of multiple controlled components of the embodiments of the present disclosure, by acquiring respectively response durations during which multiple controlled components that work cooperatively may execute their corresponding control instructions, determining respectively instruction execution delay durations of the multiple controlled components according to the acquired response durations, and controlling the multiple controlled components to execute their corresponding control instructions according to the instruction execution delay durations of the multiple controlled components, such that the multiple controlled components may be able to complete their corresponding operations synchronously, and thus a mechanical or electrical overload failure of the controlled components may be avoided, and a damage rate of the controlled components may be reduced.

Embodiment 2

Figure 2:
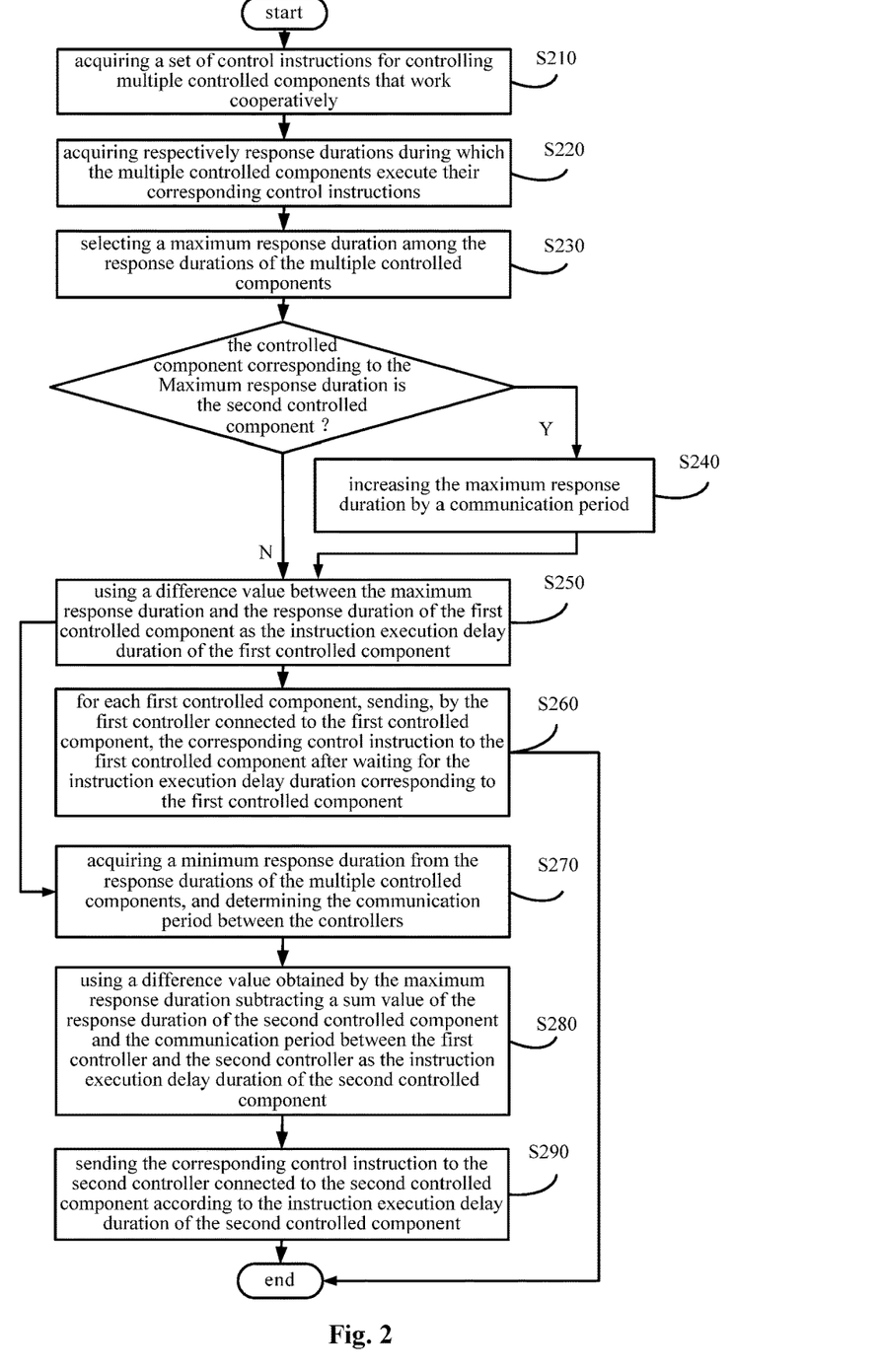
FIG. 2 is a flow diagram illustrating a synchronous control method of multiple controlled components according to embodiment 2 of the present disclosure.

FIG. 2 is a flow diagram illustrating a synchronous control method of multiple controlled components according to embodiment 2 of the present disclosure. The embodiment shown in FIG. 2 may be regarded as a specific implementation of the synchronous control method shown in FIG. 1. The synchronous control method of multiple controlled components shown in FIG. 1 may be applied to a centralized synchronous control system, and may also be applied to a distributed synchronous control system. The following describes the synchronous control method shown in FIG. 1 in detail with reference to FIG. 2 taking a distributed synchronous control system as an example, wherein the synchronous control method may be performed by a master controller or a controller that generates control instructions.

The distributed synchronous control system may include master and slave controllers. The master controller may be identical to the slave controller, and one controller may be selected as the master controller among multiple controllers, and the other controllers serve as the slave controllers. In addition, the master controller may also be different from the slave controller. For example, the master controller may be a programmable logic controller, and the slave controller may be a non-programmable logic controller. The main controller may be used to gather control signals, judge logic, distribute control instructions, monitor bus communication, and monitor controlled components. The slave controller may be used to receive and execute control instructions sent by the main controller, communicate with the main controller, issue control actions, and monitor controlled components. In the embodiments described below with reference to FIG. 2 and FIG. 3, for convenience of description, the main controller may be referred to as a first controller, and the slave controller may be referred to as a second controller. The controlled component which directly receives the control instruction sent by the first controller may be referred to as a first controlled component, and the controlled component which receives the control instruction sent by the first controller through the second controller may be referred to as a second controlled component.

In particular, S210 and S220 may be substantially the same as S110 and S120 in FIG. 1, and S230 to S290 may be specific implementation of S130 in FIG. 1.

In some embodiments, S290 may be implemented by the following process: sending, by the first controller, control instructions of the second controlled component to the second controller after waiting for the instruction execution delay duration of the second controlled component or the number of clock ticks corresponding the instruction execution delay duration of the second controlled component, or sending the control instructions of the second controlled component and the instruction execution delay duration to the second controller, such that the second controller sends the control instructions of the second controlled component to the second controlled component after waiting for the instruction execution delay duration of the second controlled component or the number of clock ticks corresponding the instruction execution delay duration of the second controlled component. The number of clock ticks corresponding to the instruction execution delay duration of the second controlled component may be a ratio of the instruction execution delay duration of the second controlled component to a sampling period of the second controller.

In some embodiments, S260 may be implemented by the following process: sending, by the first controller, control instructions of the first controlled component to the first controlled component after waiting for the instruction execution delay duration of the first controlled component or the number of clock ticks corresponding the instruction execution delay duration of the first controlled component. The number of clock ticks corresponding to the instruction execution delay duration of the first controlled component may be a ratio of the instruction execution delay duration of the first controlled component to a sampling period of the first controller.

Figure 3:
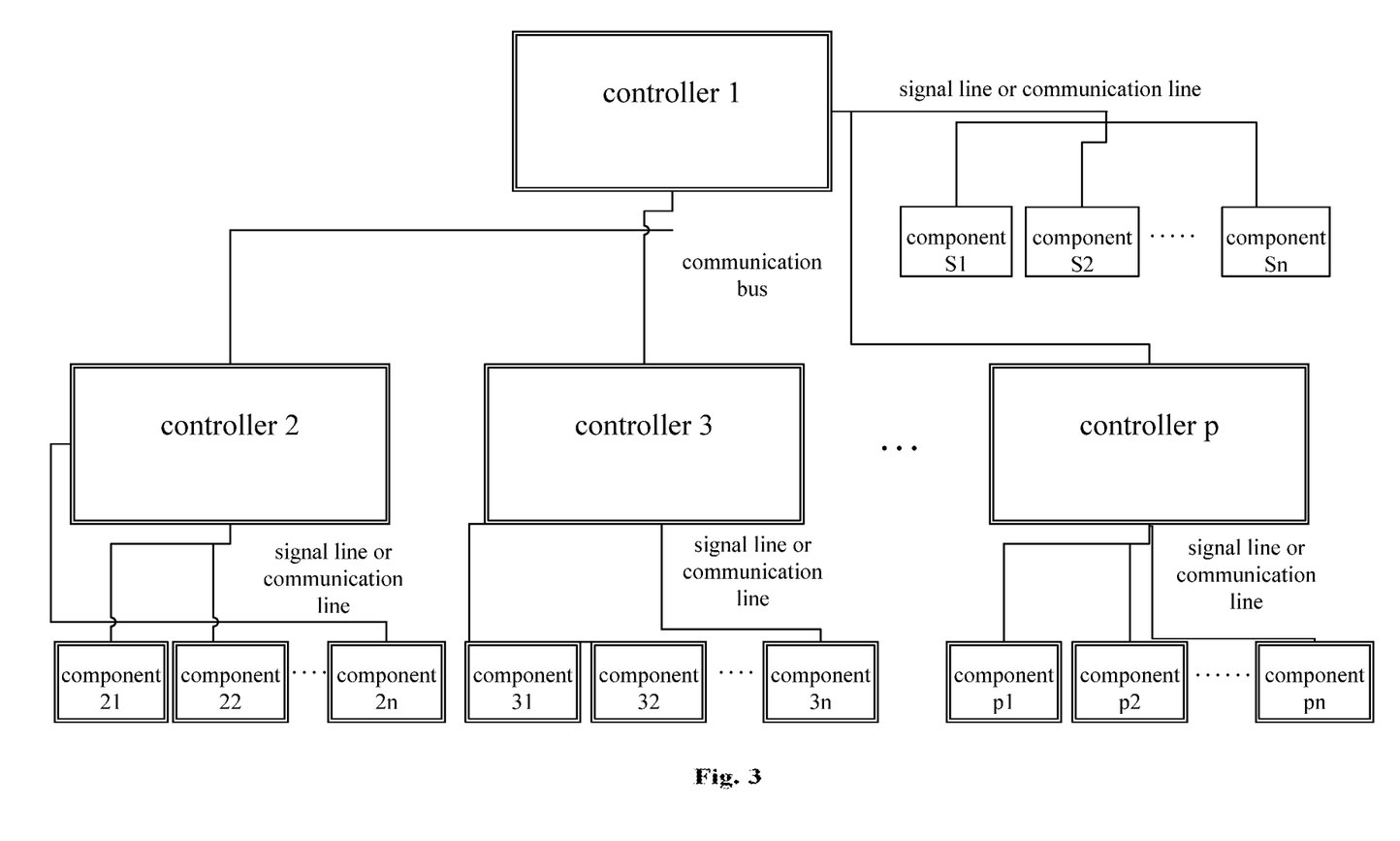
FIG. 3 is an exemplary block diagram illustrating a distributed synchronous control system according to an embodiment of the present disclosure.

FIG. 3 is a schematic structural diagram of a distributed synchronous control system according to an embodiment of the present disclosure. As shown in FIG. 3, the distributed synchronous control system may include a main controller S (i.e., controller 1) and slave controllers (i.e., controller 2, controller 3, ..., and controller p), the main controller S and the slave controllers each have multiple controlled components (i.e., component S1, a component S2, component 21, component 22, component 31, component 32, component p1, and component p2) connected thereto. The controllers may be connected with the controlled components via signal lines or communication lines, and the main controller may be connected with each slave controller via a communication bus. The response durations during which each control component of the synchronous control system executes the corresponding control instruction may be measured by a measuring component (for example, a timer), and the measured response durations, the control instructions, and information of the controlled components (for example, component number of the controlled components) may be stored in a table in the main controller, as shown in Table 1.

TABLE 1

| controlled component | control instruction | response duration |
| --- | --- | --- |
| component S1 | instruction 1 | 100 milliseconds |
| component S1 | instruction 2 | 120 milliseconds |
| component 21 | instruction 3 | 5 milliseconds |
| component 22 | instruction 4 | 20 milliseconds |
| component 31 | instruction 5 | 10 milliseconds |
| component S2 | instruction 6 | 200 milliseconds |

It should be noted that the response durations during which the same controlled component executes different control instructions respectively may be different. For example, the response duration during which the circuit breaker executes the control instruction corresponding to the closing operation may be 210 milliseconds, and the response duration during which the circuit breaker executes the control instruction corresponding to the opening operation may be 200 milliseconds.

With reference to FIG. 2, In S210, a set of control instructions for controlling the multiple controlled components that work cooperatively may be acquired.

In particular, in the distributed synchronous control system of FIG. 3, if a control function is completed by the component S1, the component S2, the component 21, the component 22, and the component 31 cooperatively, after the main controller S analyzes the control function, the control instructions to be executed by the controlled components (i.e., the component S1, the component S2, the component 21, the component 22, and the component 31) may be obtained. For example, the component S1 may execute instruction 2 in Table 1, the component S2 may execute instruction 6 in Table 1, the component 21 may execute instruction 3 in Table 1, the component 22 may execute instruction 4 in Table 1, and the component 31 may execute instruction 5 in Table 1, thereby a set of control instructions consisting of multiple control instructions may be obtained.

Wherein, the control function may be a protection control function of a controlled component. In particular, the main controller S and each slave controller may monitor the controlled components controlled by them respectively. When it is found that one or more controlled components work abnormally, it is necessary to control the corresponding controlled components to perform corresponding operations through the related protection control functions. The control function may also be a system function implemented by a series of operations performed during a normal work progress of the synchronous control system. Based on the above related contents, when some controlled components are abnormal or their detected parameters are abnormal, the protection control function may enable a combination of control actions (which may be generated through a logic processing by the controller) to be performed by the corresponding controlled components, such that the abnormal controlled components or abnormal detected parameters may be protected by the protection control function.

In S220, the response durations during which the multiple controlled components execute their corresponding control instructions may be acquired respectively.

In particular, based on the above example of S210 and Table 1, it may be obtained that the response duration during which the component S1 (i.e., the controlled component) executes instruction 2 (i.e., the control instruction) is 120 milliseconds, the response duration during which the component S2 executes instruction 6 is 200 milliseconds, the response duration during which the component 21 executes instruction 3 is 5 milliseconds, the response duration during which the component 22 executes instruction 4 is 20 milliseconds, and the response duration during which the component 31 executes instruction 5 is 10 milliseconds.

In S230, a maximum response duration may be selected among the response durations of the multiple controlled components.

In particular, a reference response duration may be selected in order to acquire the instruction execution delay duration of each controlled component. To simplify the process, the maximum response duration among the response durations acquired in S220 may be selected as the reference response duration. The process may specifically include that, the controller compares the acquired response durations with each other and selects the maximum response duration therefrom.

Based on the above example of S220, the acquired response durations may include 120 milliseconds, 200 milliseconds, 5 milliseconds, 20 milliseconds, and 10 milliseconds. By comparison, the maximum response duration may be 200 milliseconds.

In S240, the maximum response duration may be increased by a communication period between the first controller and the second controller if the controlled component corresponding to the maximum response duration is the second controlled component In particular, if the response durations of the multiple controlled components are 5 milliseconds, 10 milliseconds, 15 milliseconds, and 20 millimeters, respectively, the maximum response duration therein may be 20 milliseconds. If the controlled component corresponding to the response duration of 20 milliseconds is the second controlled component, and the communication period between the master controller and the slave controller is 2 milliseconds (wherein the communication period may be pre-stored in the master controller), then the duration during which the second controlled component receives and executes the corresponding control instruction may be 22 milliseconds, that is, the maximum response duration is increased by the communication period between the master controller and the slave controller, which is 22 milliseconds.

In the case of above S240, for the first controlled component included in the synchronous control system, the method for determining the instruction execution delay duration and controlling the first controlled component to execute its corresponding control instruction according to the instruction execution delay duration may refer to the following S250 and S260; for the second controlled component included in the synchronous control system, the method for determining the instruction execution delay duration and controlling the second controlled component to execute its corresponding control instruction according to the instruction execution delay duration may refer to the following S270-S290.

In S250, a difference value between the maximum response duration and the response duration of the first controlled component may be used as the instruction execution delay duration of the first controlled component.

In particular, based on the example of above S240, the increased maximum response duration is 22 milliseconds. If the controlled components corresponding to the response durations of 5 milliseconds and 10 milliseconds are the first controlled components, the instruction execution delay durations of the controlled components corresponding to the response durations of 5 milliseconds and 10 milliseconds may be 17 (i.e., 22−5) milliseconds and 12 (i.e., 22−10) milliseconds respectively.

In S260, for each first controlled component, the first controller connected to the first controlled component may send the control instruction corresponding to the first controlled component to the first controlled component after waiting for the instruction execution delay duration corresponding to the first controlled component.

For each first controlled component, after the main controller sends the control instruction to the first controlled component, the first controlled component may execute the control instruction instantly without spending other time. Therefore, when sending the corresponding control instruction to the first controlled component, the main controller may only wait for the instruction execution delay duration corresponding to the first controlled component. For the second controlled component, the control instruction is generated by the master controller and sent to the slave controller, the slave controller then forwards the received control instruction to the corresponding controlled component, and it may take a certain communication period for the control instruction being sent from the master controller to the slave device. Therefore, the second controlled component may not achieve synchronous simply by the instruction execution delay duration, and the communication period between the master controller and the slave controller should be considered. The corresponding processes may refer to the following S270-S290.

In S270, a minimum response duration may be acquired from the response durations of the multiple controlled components, and the communication period between the first controller and the second controller may be determined according to the minimum response duration.

In particular, the main controller may store a correspondence between the controlled component and the information of the controller connected to the controlled component, wherein the information of the controller connected to the controlled component may be the serial number of the controller. The main controller may determine multiple controlled components that need to work cooperatively when performing a certain control function, and may find the information of the controller connected to each controlled component from the above correspondence so as to determine the controller connected to each second controlled component.

The response durations during which the multiple controlled components execute their corresponding control instructions may be acquired by the process of S220, after that the minimum response duration may be acquired by comparing the acquired response durations, and then the communication period between the first controller and the second controller may be calculated according to Formula (1):

$$T\text{com} = T\text{min}/N \tag{1}$$

Wherein, Tcom is the communication period between the first controller and the second controller, Tmin is the minimum response duration, N is a predetermined parameter, and the value of N may be any value greater than zero. In some embodiments, N may take any value greater than 10 in order to make the communication period between the controllers much shorter than the minimum response duration.

Based on the example of above S230, the response durations during which the multiple controlled components that work cooperatively execute their corresponding control instructions are respectively 120 milliseconds, 200 milliseconds, 5 milliseconds, 20 milliseconds, and 10 milliseconds, and the minimum response time is 5 milliseconds. If N=20, the communication period between the controllers calculated by the above Formula (1) is 0.25 milliseconds.

In S280, a difference value obtained by the maximum response duration subtracting a sum value of the response duration of the second controlled component and the communication period between the first controller and the second controller may be used as the instruction execution delay duration of the second controlled component.

In particular, during the transfer of the control instruction from the main controller to the second controlled component, since the main controller and the slave controller need to communicate with each other, the communication period between the master controller and the slave controller should be considered. That is, for each second controlled component, the instruction execution delay duration of the second controlled component may be calculated by a predetermined algorithm utilizing the maximum response duration, the response duration of the second controlled component, and the communication period between the first controller and the second controller (i.e., the master controller and the slave controller in the present embodiment). The specific process may be: calculating the sum value of the response duration of the second controlled component and the communication period between the master controller and the slave controller, and then using the above maximum response duration to subtract the sum value, such that the difference value may be used as the instruction execution delay duration of the second controlled component. With the above process, the instruction execution delay durations of the other second controlled components that work cooperatively may be calculated.

Based on the example of above S240, the increased maximum response duration is 22 milliseconds. If the controlled components corresponding to the response durations of 15 milliseconds and 20 milliseconds are the second controlled components, the instruction execution delay durations of the controlled components corresponding to the response durations of 15 milliseconds and 20 milliseconds may be 7 (i.e., 22−15) milliseconds and 2 (i.e., 22−20) milliseconds respectively.

In S290, the control instruction corresponding to the second controlled component may be sent to the second controller connected to the second controlled component according to the instruction execution delay duration of the second controlled component.

In particular, for each second controlled component, the main controller may first send the control instruction of the second controlled component to the controller connected to the second controlled component, the controller may then send the control instruction to the second controlled component, and after that the second controlled component may execute the control instruction. In the above process, considering the communication period between the master controller and the slave controller and the response duration during which the second controlled component executes the control instruction, when the control instruction is generated, the main controller may send the control instruction to the second controlled component after waiting wait for the instruction execution delay duration of the second controlled component.

Further, the process of the above S290 may have multiple methods. The following provides two possible methods, including:

Method 1, the control instruction of the second controlled component may be sent to the second controller connected to the second controlled component with a delay according to the instruction execution delay duration of the second controlled component.

The process of method 1 may refer to the related content of above S290, which will not be described herein again.

Method 2, the control instruction of the second controlled component and the instruction execution delay duration may be sent to the second controller connected to the second controlled component, such that the second controller connected to the second controlled component may control the second controlled component to execute its corresponding control instruction with a delay.

In particular, after the control instruction is generated, the main controller may acquire the information of the second controlled component corresponding to the control instruction, and then may obtain the instruction execution delay duration of the second controlled component and determine the controller connected to the controlled component. Then, the main controller may send the control instruction and the instruction execution delay duration of the second controlled component to the above controller, and after receiving the control instruction and the instruction execution delay duration, the controller may send the control instruction to the second controlled component after waiting for the instruction execution delay duration, and the second controlled component may then execute the control instruction.

In addition, if the controlled component corresponding to the maximum response time period is not the second controlled component but the first controlled component, the process of S240 does not need to be performed, and subsequent S250 to S290 may be directly performed.

In particular, based on the example of above S230, the obtained maximum response duration is 200 milliseconds, wherein the controlled component corresponding to the maximum response duration is the first controlled component, and response durations during which the multiple controlled components that work cooperatively execute their corresponding control instructions are 120 milliseconds, 200 milliseconds, 5 milliseconds, 20 milliseconds, and 10 milliseconds, respectively. The instruction execution delay durations of the controlled components may be obtained by using the maximum response duration to subtract the response durations during which the multiple controlled components execute their corresponding control instructions. That is, the instruction execution delay duration of the component S1 (i.e., the controlled component) is 80 milliseconds, the instruction execution delay duration of the component S2 is 0 milliseconds, the instruction execution delay duration of the component 21 is 115 milliseconds, the instruction execution delay duration of the component 22 is 180 milliseconds, and the instruction execution delay duration of the component 31 is 190 milliseconds.

In particular, if the controlled component corresponding to the maximum response duration is the first controlled component, but a sum value of a maximum response duration in the response durations of the second controlled components and the communication period is greater than the acquired maximum response duration, then the sum value of the maximum response duration in the response durations of the second controlled components and the communication period may be used as the maximum response duration. For example, if the response duration of the first controlled component is 201 milliseconds, the response duration of the second controlled component is 200 milliseconds, and the communication period is 5 milliseconds, then the maximum response duration is 205 milliseconds (that is, 200 milliseconds+5 milliseconds). The subsequent process may refer to S250-S290.

In practical applications, to simplify the storage and representation of values, the process of determining the instruction execution delay duration may be instead of the process of determining the number of delay clock ticks, wherein each sampling period of the controller may be referred to as one clock tick, and the duration of the sampling period may be predetermined. For different controllers, the number of delay clock ticks may be different. For example, the number of delay clock ticks of the controller (e.g., the main controller) connected to the first controlled component may be different from the number of delay clock ticks of the controller (e.g., the slave controller) connected to the second controlled component. Wherein, the number of delay clock ticks of the controller (e.g., the main controller) connected to the first controlled component may be a ratio of the instruction execution delay duration to the sampling period of the controller (e.g., the main controller) that generates the control instruction, and the number of delay clock ticks of the controller connected to the second controlled component may be a ratio of the instruction execution delay duration to the sampling period of the controller connected to the second controlled component. The specific process may include: determining the number of delay clock ticks of the controller connected to the first controlled component by a formula $P1=(Tmax-T1)/Ts1$ according to the maximum response duration, the response duration of the first controlled component, and the sampling period of the controller connected to the first controlled component; and/or determining the number of delay clock ticks of the controller connected to the second controlled component by a formula $P2=(Tmax-T2-Tcom)/Ts2$ according to the maximum response duration, the response duration of the second controlled component, the communication period, and the sampling period of the controller connected to the second controlled component.

Wherein, Tmax is the maximum response duration, T1 is the response duration of the first controlled component, T2 is the response duration of the second controlled component, Tcom is the communication period, Ts1 is the sampling period of the controller connected to the first controlled component, Ts2 is the sampling period of the controller connected to the second controlled component, P1 is the number of delay clock ticks of the controller connected to the first controlled component, and P2 is the number of delay clock ticks of the controller connected to the second controlled component.

For ease of understanding, the above process is illustrated as follows:

Suppose a certain control function is initiated by the C1 controller, and the C2 controller forwards the control instructions. Wherein, the communication period between the controllers C1 and C2 is 5 ms, the sampling frequency of C1 controller is 2.5 kHz (i.e., the duration of the sampling period is 0.4 ms), the sampling frequency of C2 controller is 2 kHz (i.e., the duration of the sampling period is 0.5 ms). In addition, the controlled component (i.e., the first controlled component) controlled by the C1 controller is an IGBT, and the controlled component (i.e., the second controlled component) controlled by the C2 controller is a machine-side circuit breaker. After analyzing the control function, the C1 controller may determine that a control instruction for stopping the modulation should be executed by the IGBT, and a control instruction for the opening operation should be executed by the machine-side circuit breaker. Wherein the response duration during which the IGBT executes the control instruction for stopping the modulation is 0.4 ms, and the response duration during which the machine-side circuit breaker executes the control instruction for the opening operation is 200 ms. To avoid the electrical overload problem caused by the inconsistency between the above two controlled components (due to the completion time of the corresponding control instructions), the processes of S210 to S260 described above may be performed. The controlled component corresponding to the maximum response duration of 200 milliseconds is the second controlled component, in this case, the maximum response duration should be increased by the communication period (i.e., the increased maximum response duration is 205 milliseconds), and the number of instruction execution delay clock ticks of the first controlled component (IGBT) connected to the controller C1 may be calculated as $(205-0.4)/0.4=511.5$, wherein if the number of instruction execution delay clock ticks is greater than zero, the calculated value may be rounded, therefore, 511.5 may be rounded as 512. Further, the processes of S270 to S280 described above may be performed. The number of instruction execution delay clock ticks of the second controlled component (the machine-side circuit breaker) connected to the controller C2 may be calculated as $(205-5-200)/0.5=0$. In this way, the number of delay clock ticks of the controller C2 may be calculated as 0. After a delay of 512 clock ticks, the IGBT which responses faster may execute the control instruction for stopping the modulation at the 513th clock tick, and the machine-side circuit breaker may execute the control instruction for the opening operation immediately, this ensures that the IGBT and the machine-side circuit breaker may complete the corresponding operation of the corresponding control instructions substantially at the same time with an error being limited within an allowable range, and the electrical overload problem caused by the inconsistency between the multiple controlled components that work cooperatively (due to the completion time of the corresponding control instructions) may be avoided.

The embodiments of the present disclosure provide a synchronous control system of multiple controlled components. On the one hand, due to the unique structure of the distributed synchronous control system, the controllers may use a bus to communicate with each other. If the communication period of the bus is greater than the response duration of the controlled component, then the controller cannot continuously monitor the controlled components (due to the long period of blind zone in the monitoring) and the control accuracy may be reduced. Therefore, in the present disclosure, by measuring and recording (or calibrating) the response durations during which each controlled component in the distributed synchronous control system executes the corresponding control instruction, and setting the communication period between the controllers as much smaller than the response durations of each controlled component, the control accuracy may be ensured. On the other hand, by measuring the response durations of the controlled components connected to each controller, and establishing the delay algorithm for the controlled components executing their corresponding control instructions, the different controlled components that work cooperatively may complete the operations corresponding to the control instructions synchronously. Therefore, the electrical and mechanical load of the controlled component may be reduced, the stability of the system and the life of the controlled component may be improved, and maintenance costs of the system may be reduced.

Embodiment 3

Figure 4:
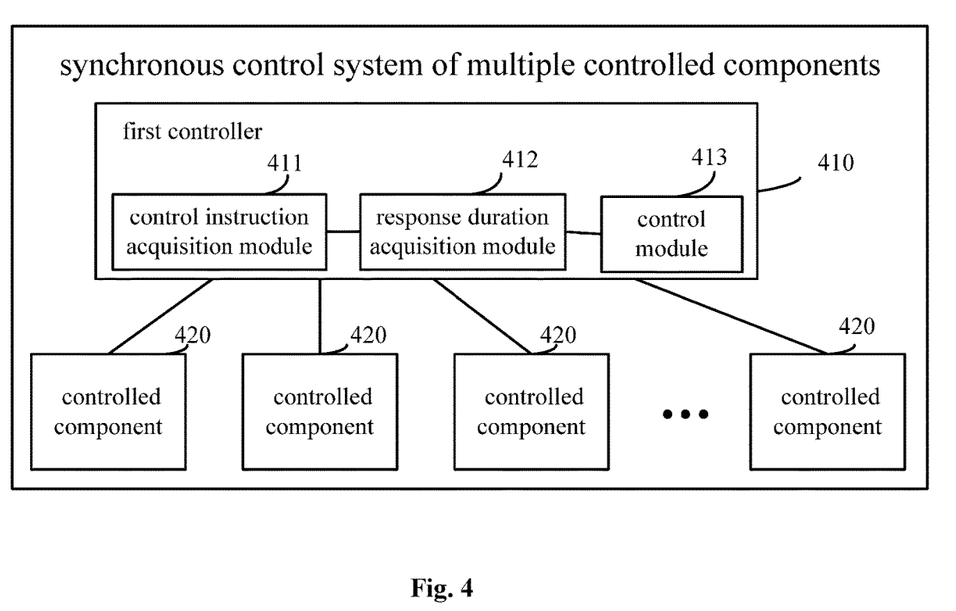
FIG. 4 is one logical block diagram illustrating a synchronous control system of multiple controlled components according to embodiment 3 of the present disclosure.

Based on the same technical idea, FIG. 4 is a logic block diagram illustrating a synchronous control system of multiple controlled components according to embodiment 3 of the present disclosure. Referring to FIG. 4, the synchronous control system may include a first controller 410 and multiple controlled components 420. The first controller 410 may include a control instruction acquisition module 411, a response duration acquisition module 412, and a control module 413. The first controller 410 may include the main controller S as shown in FIG. 3. The multiple controlled components 420 may include the component S1, the component S2, the component 21, the component 22, the component 31, the component 32, the component p1, and the component p2 as shown in FIG. 3.

The control instruction acquisition module 411 may be configured to acquire a set of control instructions for controlling the multiple controlled components 420 that work cooperatively.

The response duration acquisition module 412 may be configured to acquire the response durations during which the multiple controlled components execute their corresponding control instructions respectively.

The control module 413 may be configured to determine respectively instruction execution delay durations corresponding to the multiple controlled components 420 according to the response durations during which the multiple controlled components 420 execute their corresponding control instructions, and control the multiple controlled components 420 to execute their corresponding control instructions according to the instruction execution delay durations corresponding to the multiple controlled components 420, such that the multiple controlled components 420 are able to complete their corresponding operations synchronously.

Figure 5:
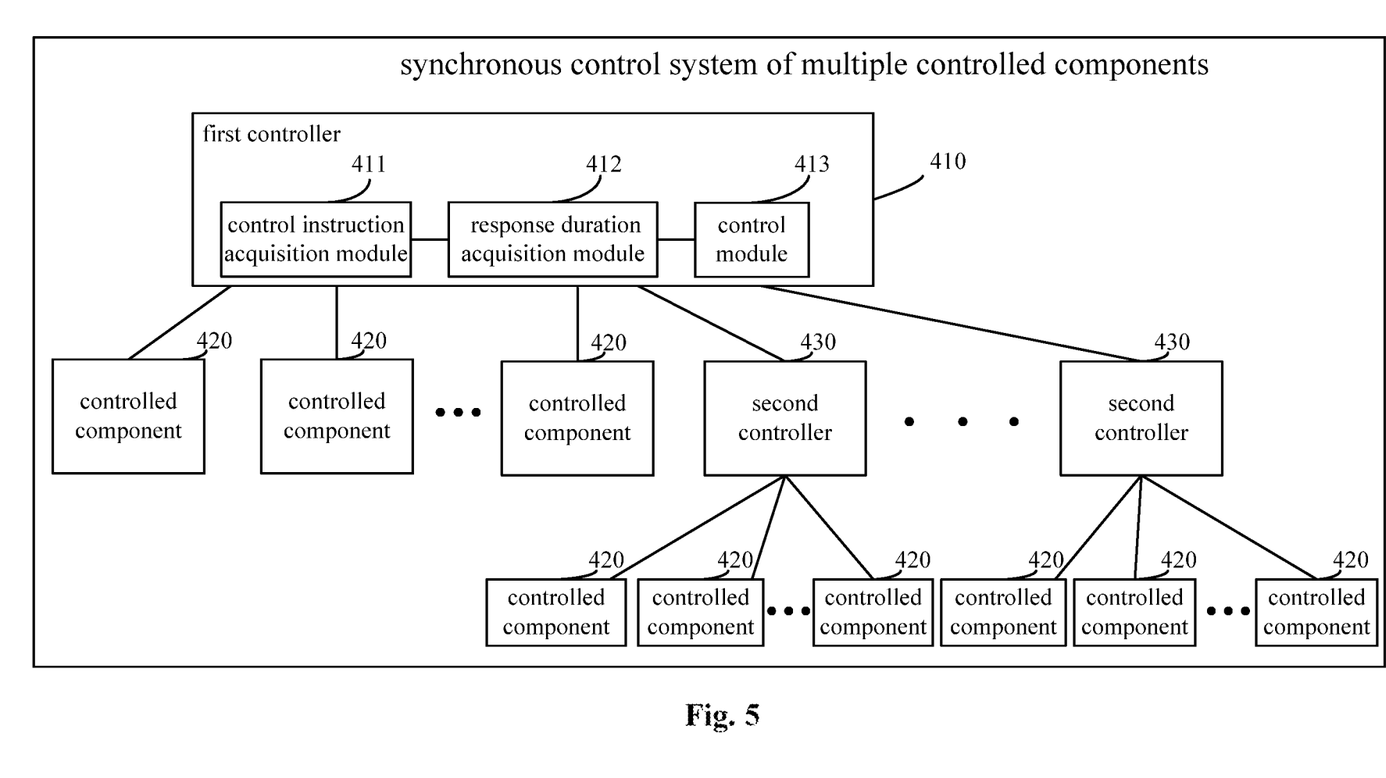
FIG. 5 is another logical block diagram illustrating a synchronous control system of multiple controlled components according to embodiment 3 of the present disclosure.

Further, based on the embodiment shown in FIG. 4, the synchronous control system shown in FIG. 5 may further include a second controller 430, the multiple controlled components 420 may include a first controlled component directly receiving control instructions sent by the first controller 410 and/or a second controlled component receiving control instructions sent by the first controller 410 via the second controller 430, the first controller 410 may be connected with the second controller 430.

Further, the control module 413 may include: a selection unit for selecting a maximum response duration among the response durations of the multiple controlled components 420; an adjustment unit for increasing the maximum response duration by a communication period between the first controller and the second controller if the controlled component corresponding to the maximum response duration is the second controlled component; an instruction execution delay duration determination unit for using a difference value between the maximum response duration and the response duration of the first controlled component as the instruction execution delay duration of the first controlled component, and/or using a difference value obtained by the maximum response duration subtracting a sum value of the response duration of the second controlled component and the communication period between the first controller and the second controller as the instruction execution delay duration of the second controlled component.

Further, the control module 413 may further include: a cooperative control unit for sending control instructions of the second controlled component to the second controller 430 after waiting for the instruction execution delay duration of the second controlled component or the number of clock ticks corresponding the instruction execution delay duration of the second controlled component, or sending the control instructions of the second controlled component and the instruction execution delay duration to the second controller 430, such that the second controller 430 sends the control instructions of the second controlled component to the second controlled component after waiting for the instruction execution delay duration of the second controlled component or the number of clock ticks corresponding the instruction execution delay duration of the second controlled component, the number of clock ticks corresponding to the instruction execution delay duration of the second controlled component is a ratio of the instruction execution delay duration of the second controlled component to a sampling period of the second controller 430; or/and sending control instructions of the first controlled component to the first controlled component after waiting for the instruction execution delay duration of the first controlled component or the number of clock ticks corresponding the instruction execution delay duration of the first controlled component, the number of clock ticks corresponding to the instruction execution delay duration of the first controlled component is a ratio of the instruction execution delay duration of the first controlled component to a sampling period of the first controller 410.

Figure 6:
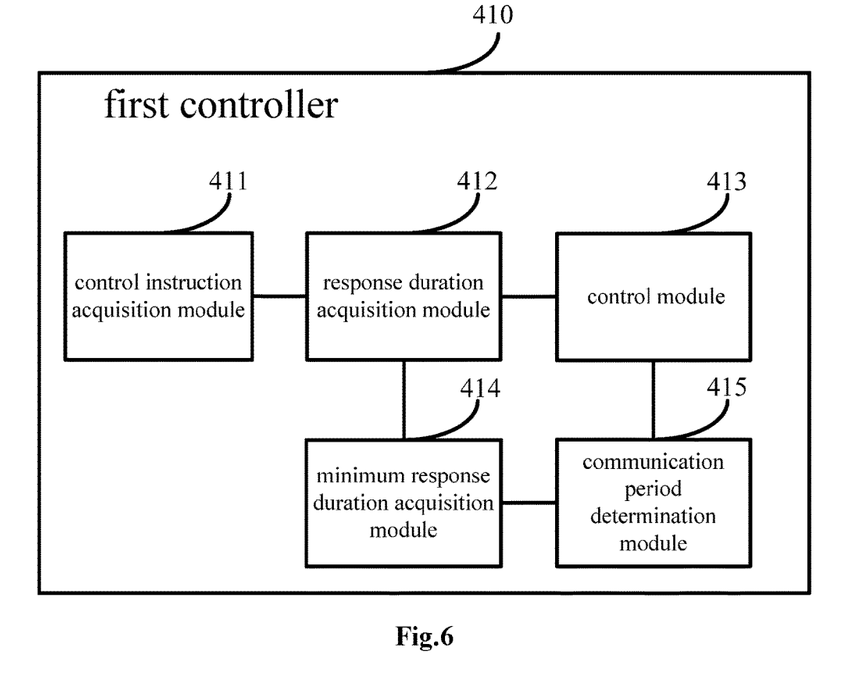
FIG. 6 is one logical block diagram illustrating a first controller in a synchronous control system of multiple controlled components according to embodiment 3 of the present disclosure.

Further, based on the embodiment shown in FIG. 5, the first controller 410 shown in FIG. 6 may further include: a minimum response duration acquisition module 414 for acquiring a minimum response duration from the response durations of the multiple controlled components 420; a communication period determination module 415 for determining the communication period between the first controller and the second controller according to the minimum response duration.

Figure 7:
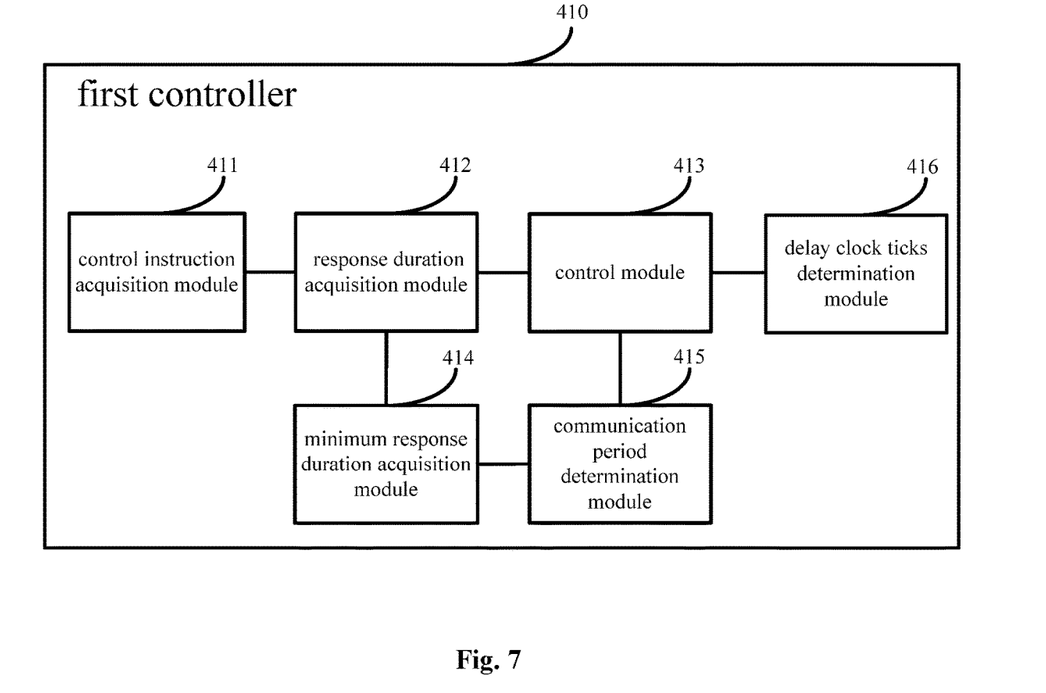
FIG. 7 is another logical block diagram illustrating a first controller in a synchronous control system of multiple controlled components according to embodiment 3 of the present disclosure.

Further, based on the embodiment shown in FIG. 6, the first controller 410 shown in FIG. 7 may further include: a delay clock ticks determination module 416 for determining the number of delay clock ticks of the first controller connected to the first controlled component by a formula $P1=(Tmax-T1)/Ts1$ according to the maximum response duration, the response duration of the first controlled component, and the sampling period of the controller connected to the first controlled component; and/or determining the number of delay clock ticks of the second controller connected to the second controlled component by a formula $P2=(Tmax-T2-Tcom)/Ts2$ according to the maximum response duration, the response duration of the second controlled component, the communication period, and the sampling period of the controller connected to the second controlled component; wherein, Tmax is the maximum response duration, T1 is the response duration of the first controlled component, T2 is the response duration of the second controlled component, Tcom is the communication period between the first controller and the second controller, Ts1 is the sampling period of the controller connected to the first controlled component, Ts2 is the sampling period of the controller connected to the second controlled component, P1 is the number of delay clock ticks of the first controller connected to the first controlled component, and P2 is the number of delay clock ticks of the second controller connected to the second controlled component.

According to the synchronous control system of multiple controlled components of the embodiments of the present disclosure, by acquiring respectively response durations during which multiple controlled components that work cooperatively may execute their corresponding control instructions, determining respectively instruction execution delay durations of the multiple controlled components according to the acquired response durations, and controlling the multiple controlled components to execute their corresponding control instructions according to the instruction execution delay durations, such that the multiple controlled components may be able to complete their corresponding operations synchronously, and thus a mechanical or electrical overload failure of the controlled components may be avoided, and a damage rate of the controlled components may be reduced.

Further, in the embodiments of the present disclosure, on the one hand, due to the unique structure of the distributed synchronous control system, the controllers may use a bus to communicate with each other. If the communication period of the bus is greater than the response duration of the controlled component, then the controller cannot continuously monitor the controlled components (due to the long period of blind zone in the monitoring) and the control accuracy may be reduced. Therefore, in the present disclosure, by measuring and recording (or calibrating) the response durations during which each controlled component in the distributed synchronous control system executes the corresponding control instruction, and setting the communication period between the controllers as much smaller than the response durations of each controlled component, the control accuracy may be ensured. On the other hand, by measuring the response durations of the controlled components connected to each controller, and establishing the delay algorithm for the controlled components executing their corresponding control instructions, the different controlled components that work cooperatively may complete the operations corresponding to the control instructions synchronously. Therefore, the electrical and mechanical load of the controlled component may be reduced, the stability of the system and the life of the controlled component may be improved, and maintenance costs of the system may be reduced.

It should be noted that, each step/component described in the present disclosure may be divided into more steps/components, and two or more steps/components or portions of each step/component may also be combined into a new step/component as desired, so as to achieve the purpose of the present invention.

The above method according to the present disclosure may be implemented in hardware or firmware, or may be implemented as software or computer code that may be stored in a recording medium such as a CD ROM, a RAM, a floppy disk, a hard disk, or a magneto-optical disk, or may be implemented as a computer code that is originally stored in a remote recording medium or a non-transitory machine-readable medium and is able to be downloaded through the network so as to be stored in a local recording medium, such that the methods described herein may be performed by a general-purpose computer, a dedicated processor, or programmable or dedicated hardware (such as an ASIC or an FPGA) using a recording medium storing such software. It will be understood that, a computer, a processor, a microprocessor controller, or programmable hardware may include a storage component (e.g., a RAM, a ROM, a flash memory, etc.) that can store or receive software or computer code, when the software or computer code is accessed and executed by the computer, processor or hardware, the processing method described herein may be implemented. In addition, when a general-purpose computer accesses code for implementing the processes illustrated herein, execution of the code may convert the general-purpose computer into a special-purpose computer for performing the processes illustrated herein.

The foregoing descriptions are merely specific implementation of the present disclosure, and the protection scope of the present disclosure is not limited thereto. Changes or modifications made by a person skilled in the art in light of the present disclosure should be considered as equivalents of the present disclosure and covered by the protection scope of the present disclosure. Therefore, the protection scope of the present disclosure shall be subject to the protection scope of the claims.

What is claimed is:

1. A synchronous control method of multiple controlled components, the synchronous control method comprising:
    acquiring respectively response durations during which the multiple controlled components execute their corresponding control instructions;
    determining respectively instruction execution delay durations corresponding to the multiple controlled components according to the response durations during which the multiple controlled components execute their corresponding control instructions, and controlling the multiple controlled components to execute their corresponding control instructions according to the instruction execution delay durations corresponding to the multiple controlled components, such that the multiple controlled components are able to complete their corresponding operations synchronously,
    wherein the multiple controlled components comprise a first controlled component directly receiving control instructions sent by a first controller and/or a second controlled component receiving control instructions sent by the first controller via a second controller,
    wherein the process of determining respectively the instruction execution delay durations corresponding to the multiple controlled components according to the response durations during which the multiple controlled components execute their corresponding control instructions comprises:
    selecting a maximum response duration among the response durations of the multiple controlled components;
    increasing the maximum response duration by a communication period between the first controller and the second controller if the controlled component corresponding to the maximum response duration is the second controlled component;
    using a difference value between the maximum response duration and the response duration of the first controlled component as the instruction execution delay duration of the first controlled component, and/or using a difference value obtained by the maximum response duration subtracting a sum value of the response duration of the second controlled component and the communication period between the first controller and the second controller as the instruction execution delay duration of the second controlled component.

2. The synchronous control method according to claim 1, wherein the process of controlling the multiple controlled components to execute their corresponding control instructions according to the instruction execution delay durations corresponding to the multiple controlled components comprises:
    sending, by the first controller, control instructions of the second controlled component to the second controller after waiting for the instruction execution delay duration of the second controlled component or the number of clock ticks corresponding the instruction execution delay duration of the second controlled component, wherein the number of clock ticks corresponding to the instruction execution delay duration of the second controlled component is a ratio of the instruction execution delay duration of the second controlled component to a sampling period of the second controller; or
    sending, by the first controller, the control instructions of the second controlled component and the instruction execution delay duration to the second controller, such that the second controller sends the control instructions of the second controlled component to the second controlled component after waiting for the instruction execution delay duration of the second controlled component or the number of clock ticks corresponding the instruction execution delay duration of the second controlled component; or
    sending, by the first controller, control instructions of the first controlled component to the first controlled component after waiting for the instruction execution delay duration of the first controlled component or the number of clock ticks corresponding the instruction execution delay duration of the first controlled component, wherein the number of clock ticks corresponding to the instruction execution delay duration of the first controlled component is a ratio of the instruction execution delay duration of the first controlled component to a sampling period of the first controller.

3. The synchronous control method according to claim 2, wherein the synchronous control method further comprises:
    acquiring a minimum response duration from the response durations of the multiple controlled components;
    determining the communication period between the first controller and the second controller according to the minimum response duration.

4. The synchronous control method according to claim 1, wherein the process of controlling the multiple controlled components to execute their corresponding control instructions according to the instruction execution delay durations corresponding to the multiple controlled components comprises:
    sending, by the first controller, control instructions of the second controlled component to the second controller after waiting for the instruction execution delay duration of the second controlled component or the number of clock ticks corresponding the instruction execution delay duration of the second controlled component, wherein the number of clock ticks corresponding to the instruction execution delay duration of the second controlled component is a ratio of the instruction execution delay duration of the second controlled component to a sampling period of the second controller; or sending, by the first controller, the control instructions of the second controlled component and the instruction execution delay duration to the second controller, such that the second controller sends the control instructions of the second controlled component to the second controlled component after waiting for the instruction execution delay duration of the second controlled component or the number of clock ticks corresponding the instruction execution delay duration of the second controlled component; or sending, by the first controller, control instructions of the first controlled component to the first controlled component after waiting for the instruction execution delay duration of the first controlled component or the number of clock ticks corresponding the instruction execution delay duration of the first controlled component, wherein the number of clock ticks corresponding to the instruction execution delay duration of the first controlled component is a ratio of the instruction execution delay duration of the first controlled component to a sampling period of the first controller.

5. The synchronous control method according to claim 4, wherein the synchronous control method further comprises:
acquiring a minimum response duration from the response durations of the multiple controlled components;
determining the communication period between the first controller and the second controller according to the minimum response duration.

6. A synchronous control system of multiple controlled components, the synchronous control system comprising a first controller and multiple controlled components connected with the first controller, wherein the first controller comprises:
a response duration acquisition module for acquiring respectively response durations during which the multiple controlled components execute their corresponding control instructions;
a control module for determining respectively instruction execution delay durations corresponding to the multiple controlled components according to the response durations during which the multiple controlled components execute their corresponding control instructions, and controlling the multiple controlled components to execute their corresponding control instructions according to the instruction execution delay durations corresponding to the multiple controlled components, such that the multiple controlled components are able to complete their corresponding operations synchronously,
wherein the synchronous control system further comprises a second controller, the multiple controlled components comprise a first controlled component directly receiving control instructions sent by the first controller and/or a second controlled component receiving control instructions sent by the first controller via the second controller, the first controller is connected with the second controller,
wherein the control module comprises:
a selection unit for selecting a maximum response duration among the response durations of the multiple controlled components;
an adjustment unit for increasing the maximum response duration by a communication period between the first controller and the second controller if the controlled component corresponding to the maximum response duration is the second controlled component;
an instruction execution delay duration determination unit for using a difference value between the maximum response duration and the response duration of the first controlled component as the instruction execution delay duration of the first controlled component, and/or using a difference value obtained by the maximum response duration subtracting a sum value of the response duration of the second controlled component and the communication period between the first controller and the second controller as the instruction execution delay duration of the second controlled component.

7. The synchronous control system according to claim 6, wherein the control module further comprises:
a cooperative control unit for
sending control instructions of the second controlled component to the second controller after waiting for the instruction execution delay duration of the second controlled component or the number of clock ticks corresponding the instruction execution delay duration of the second controlled component, wherein the number of clock ticks corresponding to the instruction execution delay duration of the second controlled component is a ratio of the instruction execution delay duration of the second controlled component to a sampling period of the second controller; or
sending the control instructions of the second controlled component and the instruction execution delay duration to the second controller, such that the second controller sends the control instructions of the second controlled component to the second controlled component after waiting for the instruction execution delay duration of the second controlled component or the number of clock ticks corresponding the instruction execution delay duration of the second controlled component; or
sending control instructions of the first controlled component to the first controlled component after waiting for the instruction execution delay duration of the first controlled component or the number of clock ticks corresponding the instruction execution delay duration of the first controlled component, wherein the number of clock ticks corresponding to the instruction execution delay duration of the first controlled component is a ratio of the instruction execution delay duration of the first controlled component to a sampling period of the first controller.

8. The synchronous control system according to claim 7, wherein the first controller further comprises:
a minimum response duration acquisition module for acquiring a minimum response duration from the response durations of the multiple controlled components;
a communication period determination module for determining the communication period between the first controller and the second controller according to the minimum response duration.

9. The synchronous control system according to claim 6, wherein the control module further comprises:
a cooperative control unit for
sending control instructions of the second controlled component to the second controller after waiting for the instruction execution delay duration of the second controlled component or the number of clock ticks corresponding the instruction execution delay duration of the second controlled component, wherein the number of clock ticks corresponding to the instruction execution delay duration of the second controlled component is a ratio of the instruction execution delay duration of the second controlled component to a sampling period of the second controller; or sending the control instructions of the second controlled component and the instruction execution delay duration to the second controller, such that the second controller sends the control instructions of the second controlled component to the second controlled component after waiting for the instruction execution delay duration of the second controlled component or the number of clock ticks corresponding the instruction execution delay duration of the second controlled component; or sending control instructions of the first controlled component to the first controlled component after waiting for the instruction execution delay duration of the first controlled component or the number of clock ticks corresponding the instruction execution delay duration of the first controlled component, wherein the number of clock ticks corresponding to the instruction execution delay duration of the first controlled component is a ratio of the instruction execution delay duration of the first controlled component to a sampling period of the first controller.

10. The synchronous control system according to claim 9, wherein the first controller further comprises:

a minimum response duration acquisition module for acquiring a minimum response duration from the response durations of the multiple controlled components;

a communication period determination module for determining the communication period between the first controller and the second controller according to the minimum response duration.

11. A synchronous control system for multiple controlled components, comprising:

a memory having computer-executable instructions stored thereon;

a processor, when executing the computer-executable instructions, the processor is operable to perform the synchronous control method of multiple controlled components according to claim 1.

12. A storage medium storing computer-executable instructions capable of implementing the synchronous control method of multiple controlled components according to claim 1.

* * * * *